United States Patent
Hosaka et al.

(10) Patent No.: US 10,353,573 B2
(45) Date of Patent: Jul. 16, 2019

(54) INFORMATION PROCESSING APPARATUS, INFORMATION PROCESSING SYSTEM, INFORMATION PROCESSING METHOD, AND NON-TRANSITORY COMPUTER-READABLE STORAGE MEDIUM FOR SKIPPING INFORMATION PROCESSING IN EXECUTION

(71) Applicant: NINTENDO CO., LTD., Kyoto (JP)

(72) Inventors: Arisa Hosaka, Kyoto (JP); Mai Yamamoto, Kyoto (JP); Masanao Arimoto, Kyoto (JP); Satoko Okada, Kyoto (JP); Etsuko Sakai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 256 days.

(21) Appl. No.: 14/862,362

(22) Filed: Sep. 23, 2015

(65) Prior Publication Data

US 2016/0364133 A1 Dec. 15, 2016

(30) Foreign Application Priority Data

Jun. 12, 2015 (JP) .................................. 2015-118998

(51) Int. Cl.
*G06F 3/0488* (2013.01)
*A63F 13/426* (2014.01)
(Continued)

(52) U.S. Cl.
CPC ...... *G06F 3/04883* (2013.01); *A63F 13/2145* (2014.09); *A63F 13/426* (2014.09);
(Continued)

(58) Field of Classification Search
CPC .............................. G06F 3/04883; G06F 3/04
See application file for complete search history.

(56) References Cited

U.S. PATENT DOCUMENTS

| | | | |
|---|---|---|---|
| 2009/0153288 A1* | 6/2009 | Hope | G06F 3/0482 340/3.1 |
| 2012/0166950 A1* | 6/2012 | Frumar | G06F 3/04883 715/719 |

(Continued)

FOREIGN PATENT DOCUMENTS

JP    H08-276073    10/1996

OTHER PUBLICATIONS

European Search Report dated Jan. 15, 2016, issued in corresponding European Application No. EP 15186639.9 (10 pages).

(Continued)

*Primary Examiner* — Roland J Casillas
(74) *Attorney, Agent, or Firm* — Nixon & Vanderhye PC

(57) ABSTRACT

Provided is an information processing apparatus that enables, during execution of information processing, a simple and intuitive operation to suspend the information processing, and to start another information processing. An example information processing apparatus includes a game processing unit that executes game processing, a suspension processing unit that suspends the game processing being executed in the game processing unit, in response to a touch-on operation to a touch panel, and a skip processing unit that switches the game processing being executed in the game processing unit to another game processing different from the game processing being suspended by the suspension processing unit, in response to a slide operation to the touch panel.

21 Claims, 8 Drawing Sheets

(51) Int. Cl.
  *A63F 13/2145*  (2014.01)
  *A63F 13/493*  (2014.01)
  *A63F 13/497*  (2014.01)
  *G06F 3/041*  (2006.01)
  *G06F 3/0481*  (2013.01)
  *G06F 3/0484*  (2013.01)

(52) U.S. Cl.
  CPC .......... *A63F 13/493* (2014.09); *A63F 13/497* (2014.09); *G06F 3/041* (2013.01); *G06F 3/0481* (2013.01); *G06F 3/0484* (2013.01)

(56) References Cited

U.S. PATENT DOCUMENTS

| | | | | |
|---|---|---|---|---|
| 2013/0097556 A1* | 4/2013 | Louch | ................... | G06F 3/0488 715/790 |
| 2013/0212541 A1* | 8/2013 | Dolenc | ................... | G06F 3/017 715/863 |
| 2015/0141136 A1* | 5/2015 | Ahuja | ................... | A63F 13/10 463/29 |

OTHER PUBLICATIONS

XP55232871; "LeechTunes version 3.0", published Sep. 18, 2013 by Leechbite http://wayback.archive.org/web/20150214010113/http://leechbite.com/?section=Apps&app=LeechTunes&preview=1 (1 page).
XP55232893; "LeechTunes: A Gesture Driven Music Player with Voice Notification for your Songs—App Saga", published Apr. 7, 2015 on appsaga.com; http://appsaga.com/leechtunes-a-gesture-driven-music-player-with-voice-notification-for-your-songs/ (8 pages).
XP55232883; "LeechTunes", published on Apr. 17, 2015 by johnbach, http://mobbl.com/project/project-1 (2 pages).

* cited by examiner

INFORMATION PROCESSING APPARATUS, INFORMATION PROCESSING SYSTEM, INFORMATION PROCESSING METHOD, AND NON-TRANSITORY COMPUTER-READABLE STORAGE MEDIUM FOR SKIPPING INFORMATION PROCESSING IN EXECUTION

CROSS REFERENCE TO RELATED APPLICATION

This application claims the benefit of Japanese Priority Patent Application No. 2015-118998 filed Jun. 12, 2015, the entire contents of which are incorporated herein by reference.

FIELD

The technology herein relates to an information processing apparatus that performs information processing using a touch panel, an information processing system, an information processing method, and a non-transitory computer-readable storage medium storing an information processing program for configuring the information processing apparatus.

BACKGROUND AND SUMMARY

This application describes information processing apparatuses that execute or play back content that progresses over time, such as a video game, a moving image, or music, as information processing. In an information processing apparatus in the past, when suspending information processing in execution, and executing another information processing, a user needs to perform an operation to call a menu, and to instruct suspension and resuming of information processing from the menu, for example. The information processing apparatus performs reading for the next information processing in response to the operation.

However, the conventional information processing apparatus needs to call the menu to suspend the information processing in execution and to skip to another information processing, and such a process requires much trouble and has not provided an intuitive operation.

An objective of the technology is to provide an information processing system, an information processing apparatus, an information processing method, and a non-transitory computer-readable storage medium storing an information processing program, which enable, during execution of information processing, a simple and intuitive operation to suspend the information processing and start another information processing.

Example embodiment of an information processing apparatus includes at least one processor, the at least one processor being configured to execute information processing, the at least one processor being further configured to suspend the information processing being executed, in response to a touch-on operation to a touch panel, and the at least one processor being further configured to switch the information processing being executed to another information processing different from the information processing, in response to a slide operation to the touch panel.

According to this configuration, the information processing in execution is suspended by the touch-on operation to the touch panel, and a skip (switch) to the other information processing is performed by the slide operation following the touch-on operation. Therefore, the skip of the information processing can be performed by a simple and intuitive operation.

In the above information processing apparatus, the at least one processor may be configured to cancel suspension when a touch-off operation is performed after the touch-on operation is performed, and the at least one processor may be configured to resume the suspended information processing when the suspension is canceled.

According to this configuration, the information processing can be resumed after the information processing in execution is suspended by the touch-on operation. Note that, when it is not necessary to resume the information processing in suspension, the slide operation is instantly performed (performs touch while sliding) from the touch-on operation, so that a skip to another information processing can be instantly performed.

In the above information processing apparatus, the at least one processor may be configured to switch the information processing being executed to the other information processing when there is the slide operation after the touch-on operation and before a touch-off operation.

According to this configuration, when the slide operation is performed without performing the touch-off operation from the touch-on operation, switch to the other information processing is performed.

In the above information processing apparatus, the information processing may be processing using content that makes progress over time.

According to this configuration, the information processing using content that makes progress over time is suspended by the touch-on operation. Note that the content that makes progress over time includes, but is not limited to, game content, moving image content, and music content.

In the above information processing apparatus, the content may be game content, and the information processing may include game processing that makes progress without depending on an operation of a user.

According to this configuration, the information processing that makes progress without depending on an operation of a user and using game content can be suspended by the touch-on operation, and a skip to game processing using another game content can be made by the slide operation continuing to the touch-on operation.

In the above information processing apparatus, the game processing may be a series of stage-based game processing, and the other information processing may be game processing of a stage next to a stage where the game processing is being executed.

According to this configuration, a skip from the stage where the game processing is being executed to the next stage can be made, and the game processing can be executed.

In the above information processing apparatus, the content may be moving image content or music content, and the information processing may be playback processing of the content.

According to this configuration, the playback processing of the moving image content or the music content can be suspended by a touch-on operation, and a skip to playback processing of another moving image content or music content can be performed by a slide operation continuing to the touch-on operation.

In the above information processing apparatus, the moving image content or the music content may be a series of a plurality of content items, and the other information processing may be playback processing of moving image content or music content next to the moving image content or the music content for which the playback processing is being executed.

According to this configuration, a skip from the moving image content or the music content for which the playback processing is being executed to the next moving image content or music content can be performed, and the playback processing can be executed. Note that the series of a plurality of moving image content items may be chapters or scenes of a movie. Further, the series of a plurality of music content items may be content items of music arranged in order as a play list.

In the above information processing apparatus, the plurality of content items may be arranged in order and form a set, and a plurality of the sets may be arranged in order, and the at least one processor may be configured to start information processing using another content before or after the content, and belonging to a same set as the content, the information processing of the content being suspended, or start information processing using content belonging to another set before or after a set to which the content belongs, the information processing of the content being suspended, according to a direction of the slide input.

According to this configuration, switch of content within the set, and switch to another set can be selectively performed according to the direction of the slide input.

The above information processing apparatus may further include a storage device configured to store information that identifies the information processing suspended, in response to the slide operation.

With this configuration, the information that identifies a skipped stage is stored. Therefore, the game processing of the skipped stage can be executed later, by reference to the stored information.

In the above information processing apparatus, the at least one processor may be configured to switch the information processing to another information processing different from the information processing in suspension, in response to the slide operation in a predetermined direction.

According to this configuration, the direction of the slide operation to skip the information processing is limited.

In the above information processing apparatus, the at least one processor may be configured to switch the information processing to another information processing, which is different depending on a direction of the slide operation.

According to this configuration, different another information processing is started according to the direction of the slide operation. For example, the other information processing to be started can be made different, depending on a case where the slide operation is in a right direction and a case where the slide operation is in a left direction.

In the above information processing apparatus, the at least one processor may be configured to determine that the slide operation has been performed when a slide amount is a predetermined value or more.

According to this configuration, a possibility that a touch operation by the user with intention of the touch-on operation and without intention to perform the slide operation is wrongly recognized as the slide operation can be decreased.

In the above information processing apparatus, the at least one processor may be configured to determine that the slide operation has been performed when the slide amount within a predetermined time is a predetermined value or more.

According to this configuration, a possibility that a touch operation by the user with intention of the touch-on operation and without intention to perform the slide operation is wrongly recognized as the slide operation can be further decreased.

The information processing may involve screen display, and the at least one processor may be configured to stop a screen to be displayed, when the information processing is suspended.

According to this configuration, the screen to be displayed can be stopped by the touch-on operation.

Example embodiment of an information processing system includes a touch panel and at least one processor, the at least one processor being configured to execute information processing, the at least one processor being further configured to suspend the information processing being executed, in response to a touch-on operation to the touch panel, and the at least one processor being further configured to switch the information processing being executed to another information processing different from the information processing, in response to a slide operation to the touch panel.

Even with this configuration, the information processing in execution is suspended by the touch-on operation to the touch panel, and a skip (switch) to the other information processing is performed by the slide operation following the touch-on operation. Therefore, the skip of the information processing can be performed by a simple and intuitive operation.

Example embodiment of an information processing method includes executing information processing, a suspending the information processing being executed, in response to a touch-on operation to a touch panel, and switching the information processing being executed to another information processing different from the information processing, in response to a slide operation to the touch panel.

Even with this configuration, the information processing in execution is suspended by the touch-on operation to the touch panel, and a skip (switch) to the other information processing is performed by the slide operation following the touch-on operation. Therefore, the skip of the information processing can be performed by a simple and intuitive operation.

Example embodiment of a storage medium is a non-transitory computer-readable storage medium storing an information processing program for, by being executed by a computer, causing the computer to function as at least one processor, the at least one processor being configured to execute information processing, the at least one processor being further configured to suspend the information processing being executed, in response to a touch-on operation to the touch panel, and the at least one processor being further configured to switch the information processing being executed to another information processing different from the information processing, in response to a slide operation to the touch panel.

Even with this configuration, the information processing in execution is suspended by the touch-on operation to the touch panel, and a skip (switch) to the other information processing is performed by the slide operation following the touch-on operation. Therefore, the skip of the information processing can be performed by a simple and intuitive operation.

DETAILED DESCRIPTION OF NON-LIMITING EXAMPLE EMBODIMENTS

Hereinafter, Example embodiment will be described with reference to the drawings. Note that Example embodiment described below are examples of when the technology is implemented, and the technology is not limited to specific configurations described below. In implementation of the technology, a specific configuration according to an embodiment may be appropriately employed. Hereinafter, a game device will be described as an example of an information processing apparatus. The game device performs game processing using game content, as information processing.

Figure 1:
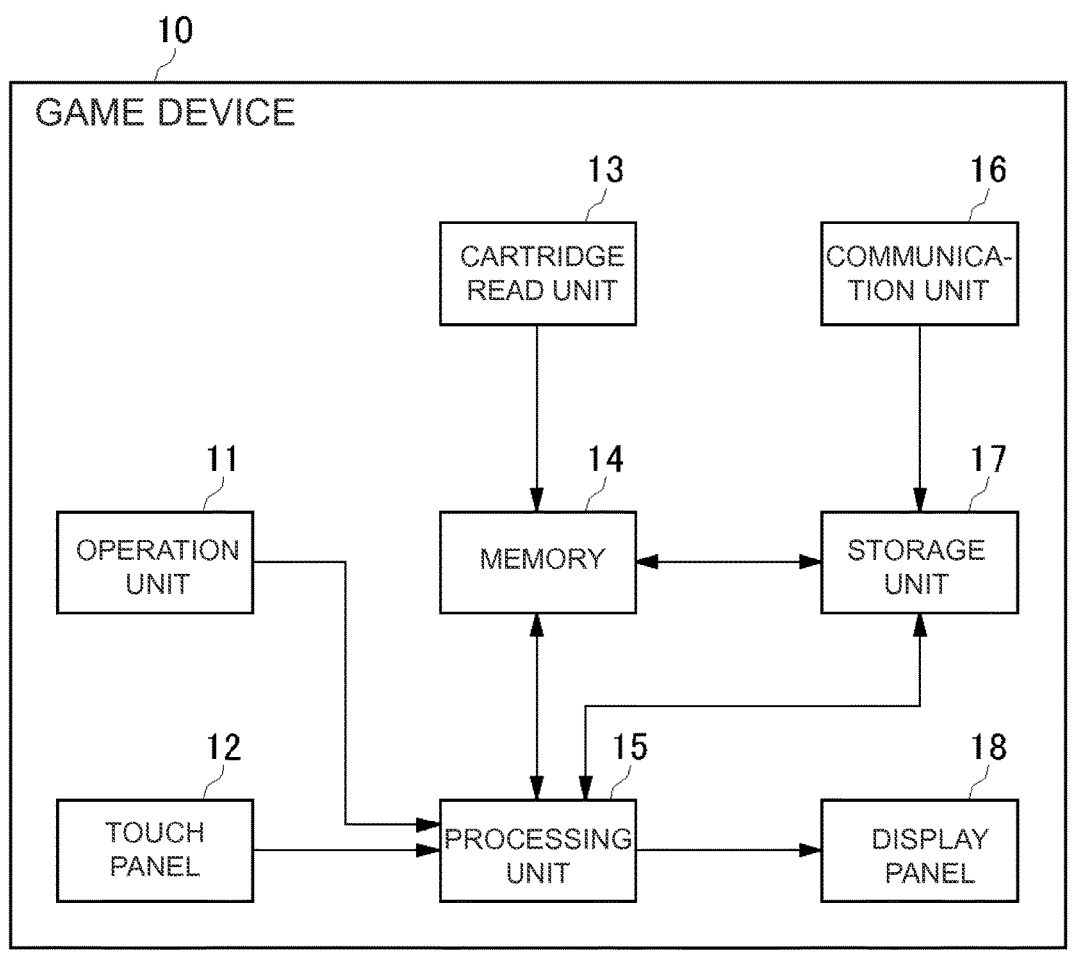
FIG. 1 shows an example non-limiting hardware configuration of a game device.

FIG. 1 is a block diagram illustrating a hardware configuration of a game device of Example embodiment. A game device 10 includes a plurality of operation units 11, a touch panel 12, a cartridge read unit 13, a memory 14, a processing unit 15, a communication unit 16, a storage unit 17, and a display panel 18. The touch panel 12 is provided on a surface of the display panel 18, and a user can perform a touch operation in association with a screen displayed on the display panel 18.

The operation unit 11 is a member that can be physically operated by the user, such as a button, a cross button, a slide pad, a switch, and a lever. The operation unit 11 detects pressing of the button, a tilt of the slide pad, positions of the switch and the lever, and the like, and output operation input signals.

The touch panel 12 detects a place where an object is being in contact at a predetermined frame rate (for example, 60 fps) in a resistive film system (pressure sensitive system). The object brought to come in contact with the touch panel 12 may be a stylus or a finger. Note that the detection system of the touch panel 12 is not limited to the resistive film system, and may be another system such as an inductive coupling system or a capacitive sensing system. When there is a contact by the object at any position, the touch panel 12 detects the contact, as a touch operation, and outputs a detection signal.

Note that, in the description below, an operation to be in contact with the touch panel by an object is referred to as touch operation. Especially, an operation to cause the touch panel to be in a state of detecting the touch operation from a state of undetecting the touch operation is referred to as touch-on operation, and an operation to cause the touch panel to be in the state of undetecting the touch operation from the state of detecting the touch operation is referred to as touch-off operation. Further, an operation to move (slide) a touch position in a state of doing the touch operation is referred to as slide operation. In the present embodiment, only when movement of the touch position satisfies a predetermined condition, the movement is detected as the slide operation for executing predetermined processing, as described below.

The cartridge read unit 13 reads data stored in a cartridge (not illustrated) attachable/detachable to/from the game device 10. In the cartridge, a game processing program is stored as game software.

The communication unit 16 transmits/receives data to/from another computer through a communication network. The communication unit 16 is connected to an access point of the communication network by wireless communication. The communication unit 16 of the present embodiment especially receives a stage list and stage data as game content described below through the communication network.

Here, a relationship between the game software, and the stage list and the stage data will be described. A game executed by the game software of the present embodiment is a game in which a user operates an own character in a virtual space, advances the own character from a starting point to a goal point while attacking or avoiding an opponent character or an obstacle. The virtual space (including the opponent character, the obstacle, and the like set therein) from the starting point to the goal point is called stage, and when the own character reaches the goal point within a predetermined time limit, the stage is completed, and the game is moved onto the next stage. Note that, in this game, the opponent character is moved according to the game processing program even if the user does not operate the own character, and at least countdown of the time limit progresses even if there is no opponent character.

The game software of the present embodiment further has a function to create a stage as described above. Further, the game software of the present embodiment has a function to upload the created stage to a server on the communication network, using the communication unit 16, and a function to download the stages created by other persons from the server, using the communication unit 16.

To playing the game with the stage created by another person, first, the stage list of 100 stages is downloaded from the server. In this stage list, 100 indexes that identify the respective 100 stages are placed in order from a first stage to a hundredth stage.

To start the game after downloading the stage list, first, the stage data of the first stage is downloaded. When the first stage is completed, next, the stage data of a second stage is downloaded according to the stage list. These stage data are used in the game software, so that the game using the stage data created by other persons can be played. As described above, the game of the present embodiment is a stage-based game in which a series of stages is played in order.

The storage unit 17 stores the stage list and the stage data received by the communication unit 16. Note that, in the above description, an example in which the game software is stored in the cartridge, and the cartridge read unit 13 reads the game software has been described. However, the game software may be stored in the storage unit 17 in advance, or may be downloaded from a software providing server on the communication network using the communication unit 16, and stored in the storage unit 17.

The memory 14 temporarily stores the game software read from the cartridge by the cartridge read unit 13. Further, the memory 14 reads and temporarily stores the stage list and the stage data downloaded using the communication unit 16 and stored in the storage unit 17.

The processing unit 15 performs the game processing, using the stage list and the stage data expanded in the memory 14, according to the game software expanded in the memory 14. Note that the processing unit 15 also has a function to control the cartridge read unit 13, the communication unit 16, the storage unit 17, the display panel 18, and the like, in addition to the game processing. For example, the processing unit 15 controls downloading of the stage data of the next stage according to the stage list, after completion of the stage.

The display panel 18 is configured from a liquid crystal panel. The game processing according to the game software involves display to the display panel 18, and the display panel 18 displays a game screen in accordance with the game processing.

Although not illustrated in FIG. 1, the game device 10 includes a camera, a microphone, a speaker, a vibration module, an acceleration sensor, a gyro sensor, and a contactless communication device, as the hardware configuration.

Figure 2:
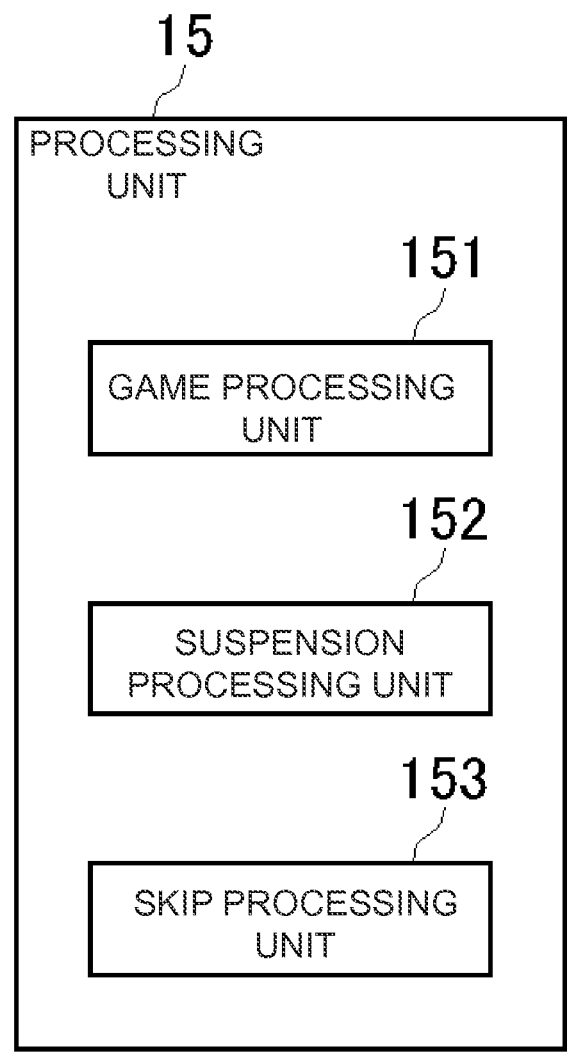
FIG. 2 shows an example non-limiting functional configuration of a control unit.

FIG. 2 is a block diagram illustrating a functional configuration of the processing unit 15. The processing unit 15 is configured from an arithmetic processing circuit of a computer or a processor. The processing unit 15 executes the game processing program as the game software on an operation system, so that a game processing unit 151, a suspension processing unit 152, and a skip processing unit 153, as an information processing unit, are realized. The game processing unit 151, the suspension processing unit 152, and the skip processing unit 153 may be configured from one processor, or may be realized by a plurality of distributed processors.

The game processing unit 151 performs the game processing according to the game processing program. The game processing unit 151 displays the game screen including the stage and the own character on the display panel 18 according to the stage data, and moves the own character on the stage according to an operation of the user to the operation unit 11 to make the game progress.

Figure 3:
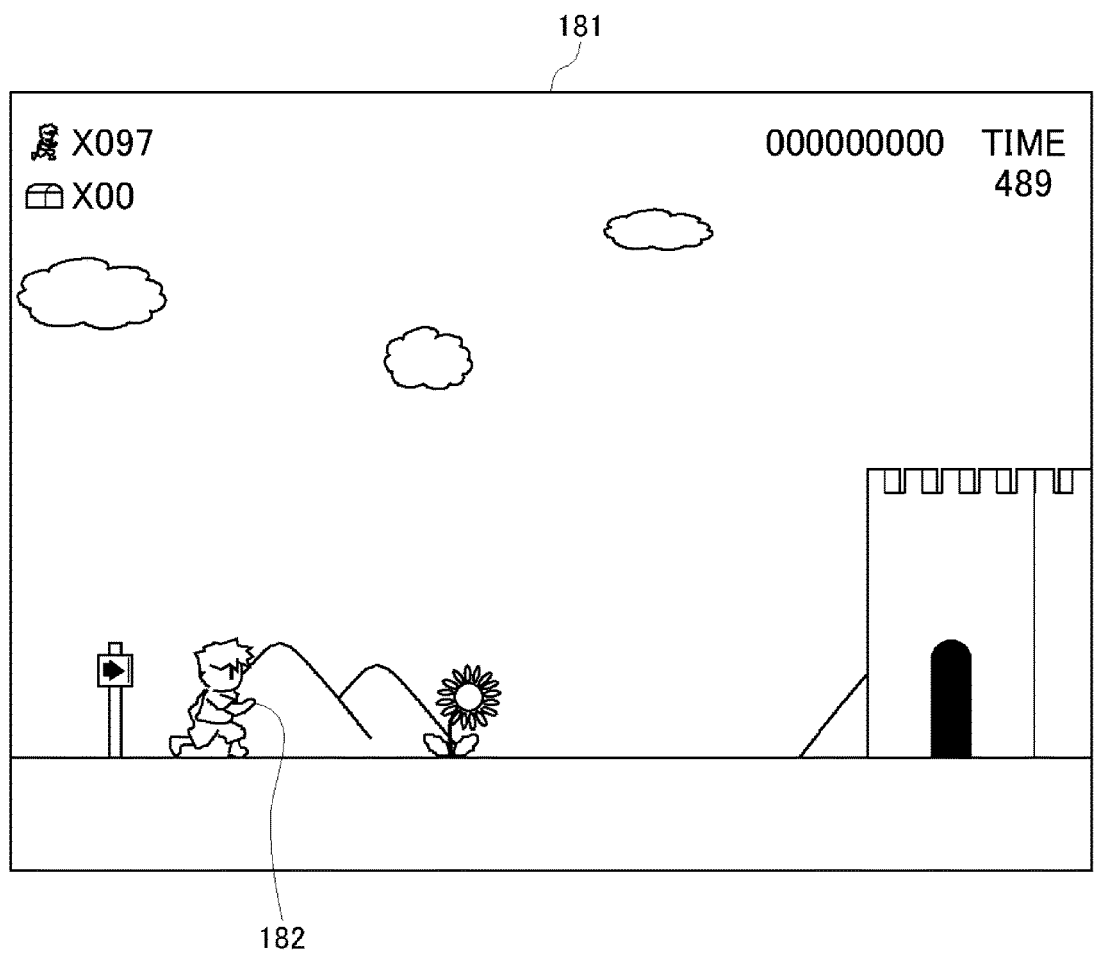
FIG. 3 shows an example non-limiting game screen.

FIG. 3 is a diagram illustrating an example of the game screen. On a game screen 181, the stage as the virtual space is displayed, and an own character 182 existing on the stage is also displayed. Further, an acquired point, a remaining time, remaining lives, and the like are displayed on the game screen 181, as information indicating a status of the game.

The suspension processing unit 152 monitors the touch-on operation to the touch panel 12 in a predetermined period (for example, 60 fps). The suspension processing unit 152 equally detects a touch to any position on the touch panel 12, as the touch-on operation. Instead, the suspension processing unit 152 may detect a touch to a predetermined region (a region excluding a periphery, for example) on the touch panel 12, as the touch-on operation for suspending the game processing.

When having detected the touch-on operation, the suspension processing unit 152 controls the game processing unit 151 to perform suspension processing of suspending the game processing. In this suspension processing, the game processing including movement of all characters on the stage, the count of the time limit, and the like is stopped, and the game screen 181 is stopped, accordingly. When having detected the touch-on operation, the suspension processing unit 152 stores the state of the game processing of that time in the memory 14, and captures the game screen 181, as the suspension processing. The suspension processing unit 152 then generates a stop screen 184, using the captured game screen (capture screen) 183, and displays the stop screen 184 on the display panel 18.

Figure 4:
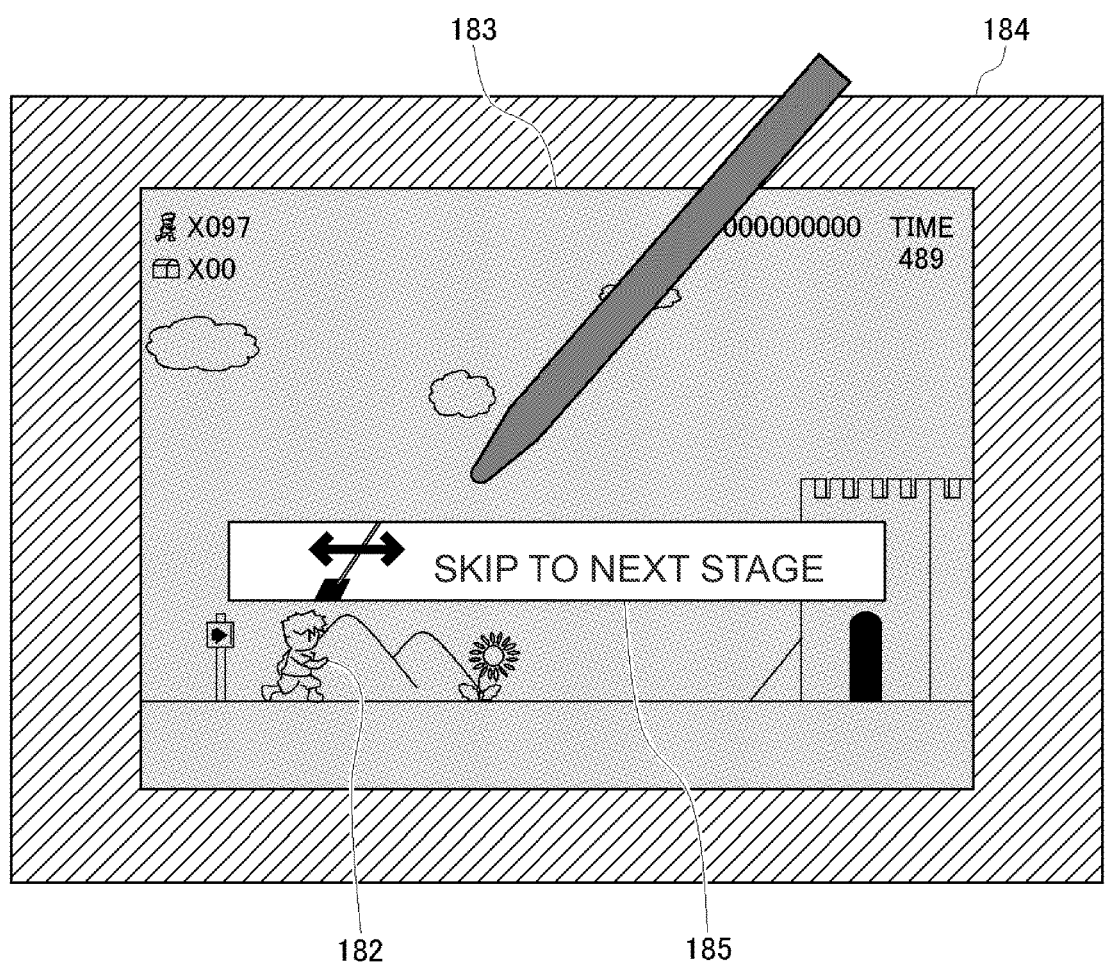
FIG. 4 shows an example non-limiting stop screen.

FIG. 4 is a diagram illustrating an example of the stop screen 184. As illustrated in FIG. 4, on the stop screen 184, the capture screen 183 is displayed in the center with a slightly smaller size than the game screen 181, and the capture screen 183 is filtered. Further, a message 185 notifying that a skip of the stage is available with a slide operation is superimposed and displayed on the capture screen 183. With such change of the screen, that is, change from the game screen 181 to the stop screen 184, the user can easily understand the state where the skip to the next stage is available (hereinafter, referred to as "skip effective state").

Further, the suspension processing unit 152 monitors cancellation of the touch, as the suspension processing. When having detected the cancellation of the touch (touch-off operation) (when the touch operation has been undetected), the suspension processing unit 152 controls the game processing unit 151 to resume the game processing. The game processing unit 151 reads the state of the game processing at the time of suspension stored in the memory 14, and resumes the game processing. Note that data of the captured game screen (capture screen) at the time of suspension is discarded (deleted).

Figure 5:
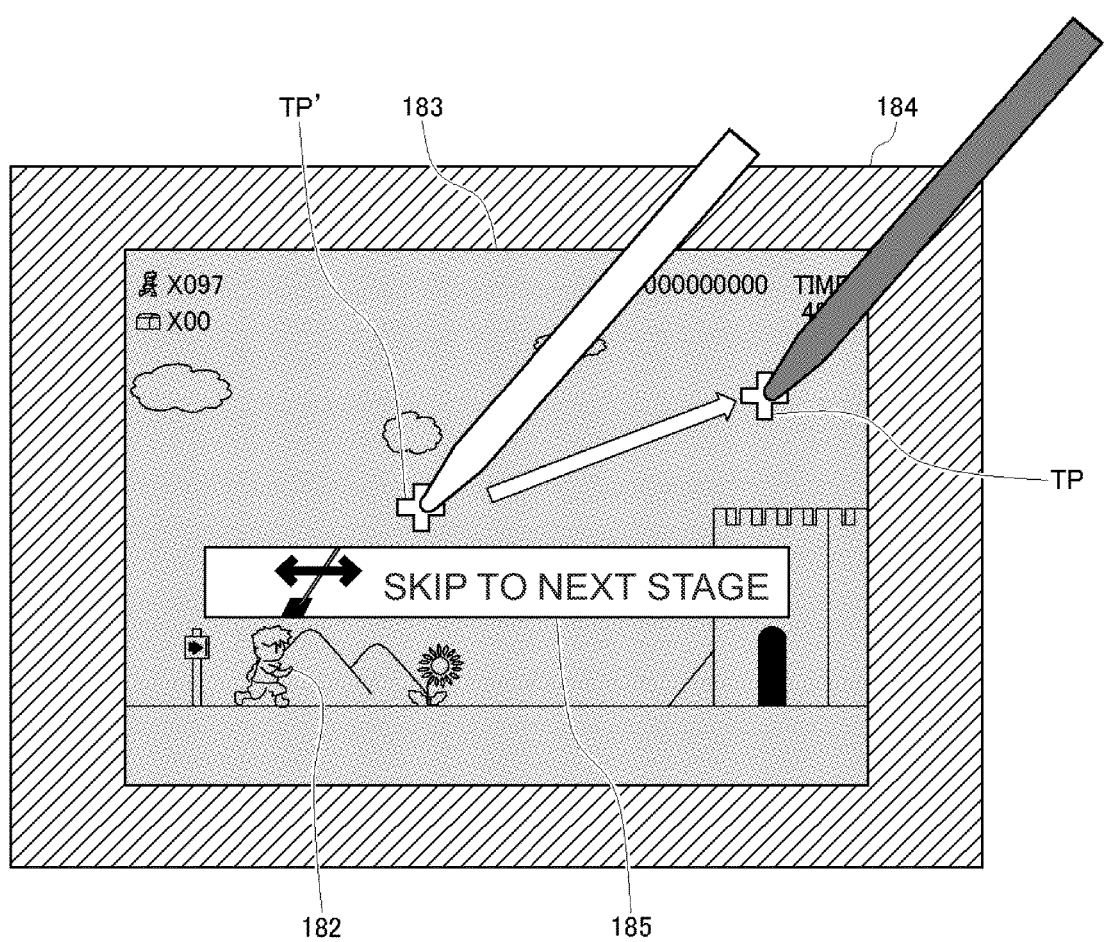
FIG. 5 shows an example non-limiting slide operation.

The skip processing unit 153 monitors the slide operation, in the skip effective state where the game is suspended. FIG. 5 is a diagram illustrating an example of the slide operation. When change of the touch position (slide amount) in a predetermined time (a predetermined number of frames) is a predetermined distance or more, the skip processing unit 153 detects an operation that has changed the touch position in that way, as the slide operation, and recognizes a sliding direction. To be specific, in each frame, when a direct distance between a position of a touch position TP' of the predetermined number of frames (10 frames, for example) before and a position of a current touch position TP is larger than a predetermined distance (corresponding to 133 dots, for example), the skip processing unit 153 detects the operation, as the slide operation, and recognizes a direction from the touch position TP' of the predetermined number of frames before to the current touch position TP, as the sliding direction.

When having detected the slide operation, the skip processing unit 153 performs the skip processing. In the skip processing, first, the skip processing unit 153 controls the suspension processing unit 152 to stop the monitoring of the cancellation of the touch. Further, the skip processing unit 153 performs processing of transferring the game to the next stage according to the stage list, as the skip processing.

Figure 6:
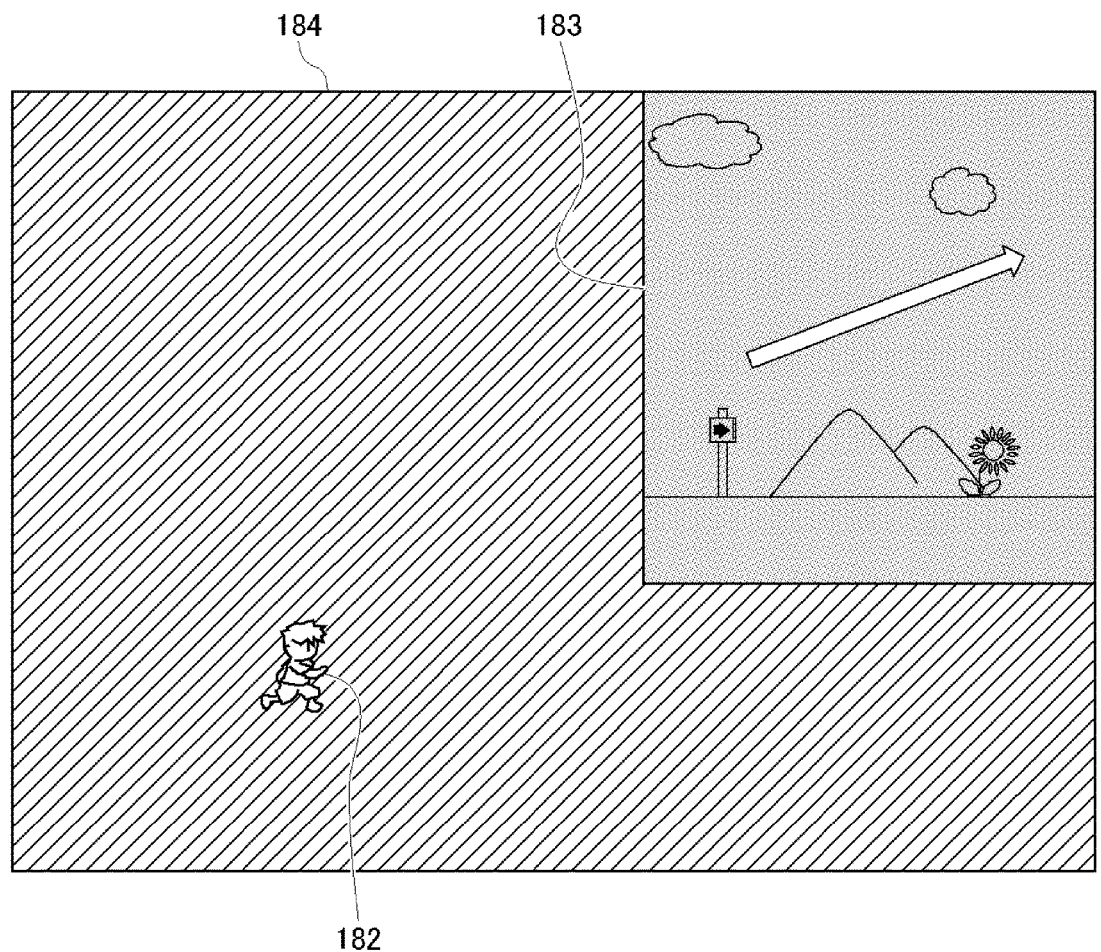
FIG. 6 shows an example non-limiting skip processing.
Figure 7:
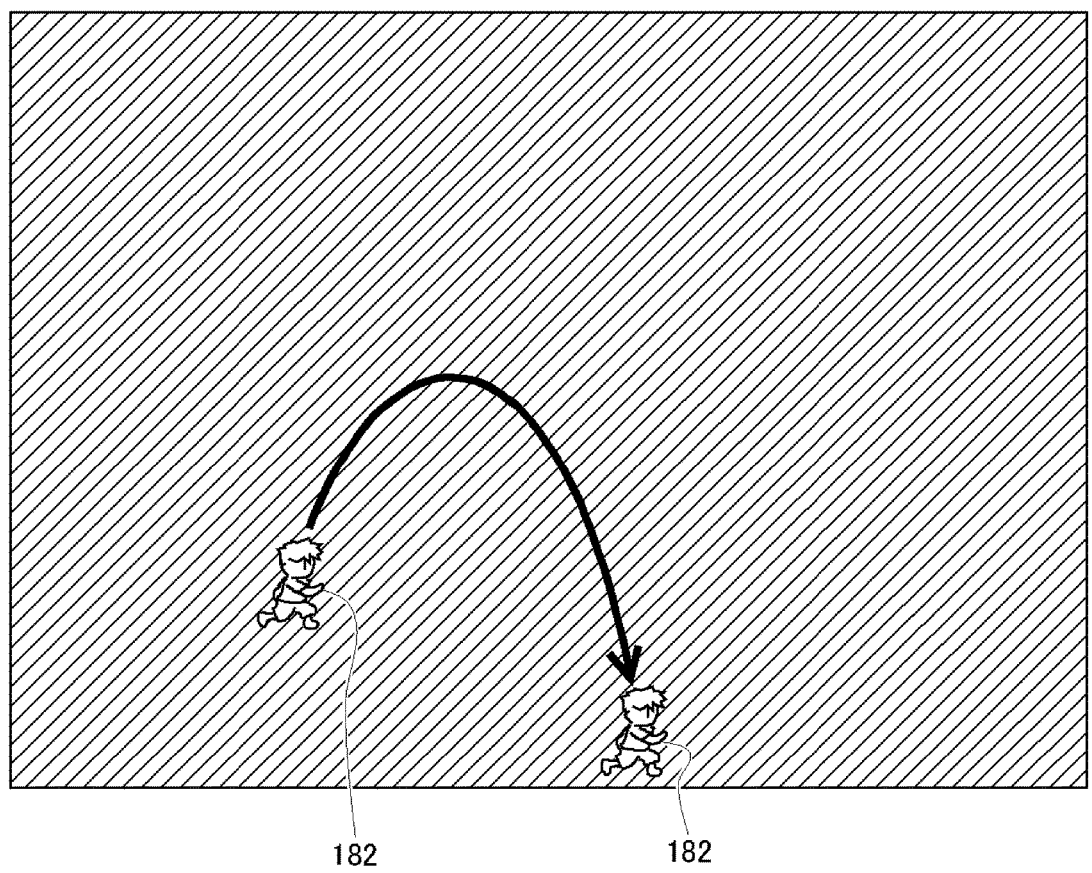
FIG. 7 shows an example non-limiting skip processing.

FIGS. 6 and 7 are diagrams illustrating an example of the skip processing. In the skip processing, first, as illustrated in FIG. 6, the skip processing unit 153 moves the capture screen 183 included in the stop screen 184 to the recognized sliding direction to frame out. At this time, the skip processing unit 153 causes the own character 182, of the capture screen 183, to remain in a position on the capture screen 183. Therefore, the skip processing unit 153 draws the own character 182, in the position of the own character 182 on the capture screen 183, separately from the capture screen 183. When the capture screen 183 is moved in the sliding direction by a fixed direction, the separately drawn own character 182 frames out in a way to form a parabola and fall downward, as illustrated in FIG. 7.

When the above animation from FIGS. 6 and 7 is terminated, the skip processing unit 153 downloads the stage data of the next stage according to the stage list. When having completed the download of the stage data of the next stage, the game processing unit 151 displays a stage name of the next stage on the display panel 18, waits for an instruction of start of the game processing from the user, and starts the game processing of the next stage using the downloaded stage data, in response to the instruction of the user. Even in this game processing, the game processing unit 151, the suspension processing unit 152, and the skip processing unit 153 are operated similarly to the above description, so that the suspension processing of suspending the game processing in execution, and the skip processing of transferring from the stage in execution to the next stage are executed.

Figure 8:
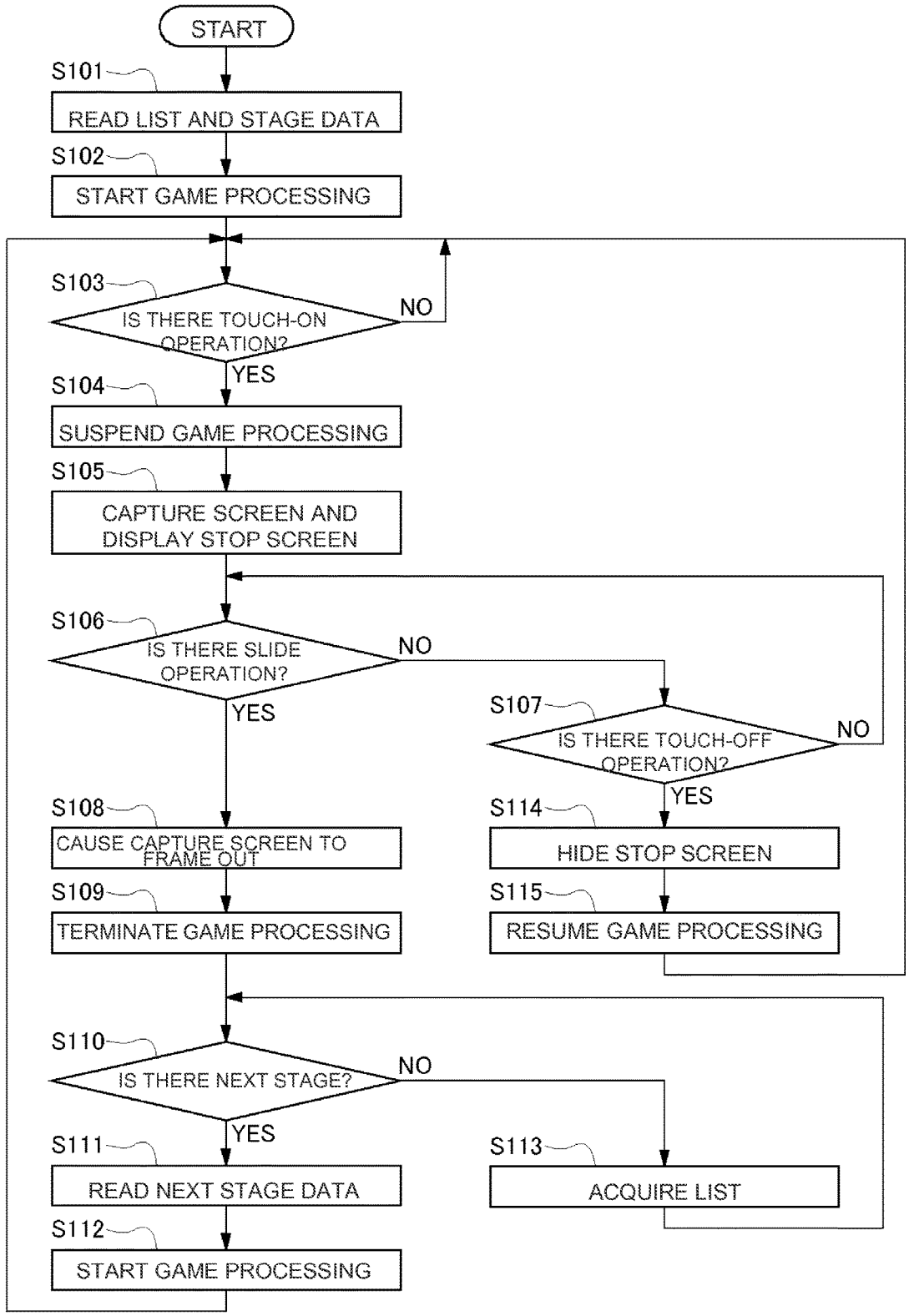
FIG. 8 shows an example non-limiting information processing method.

FIG. 8 is a flowchart of an information processing method executed by the game device as an information processing apparatus of the present embodiment. First, the game device 10 downloads the stage list of 100 stages and the stage data of the first stage, stores the downloaded data in the storage unit 17, and expands the data on the memory 14 (step S101). Next, the game processing unit 151 waits for the instruction of start of the game processing from the user, and starts the game processing in response to the instruction (step S102).

While the game processing unit 151 performs the game processing, the suspension processing unit 152 monitors the touch-on operation on a constant basis (step S103). That is, until the touch-on operation is given, the suspension processing unit 152 continues to monitor the touch-on operation (NO in step S103). When the touch-on operation is given (YES in step S103), the suspension processing unit 152 controls the game processing unit 151 to suspend the game processing (step S104), and captures the game screen 181 of that time to generate the stop screen 184, and displays the stop screen 184 on the display panel 18 (step S105).

In the state where the stop screen 184 is displayed, the skip processing unit 153 monitors the slide operation (step S106), and the suspension processing unit 152 monitors the cancellation of the touch operation (touch-off operation) (step S107). When there is no slide operation and no cancellation of the touch operation (NO in step S106 and NO in step S107), the display of the stop screen 184 is maintained, and the monitoring of the slide operation (step S106) and the monitoring of the touch-off operation (step S107) are repeated.

When there is a slide operation (YES in step S106), the skip processing unit 153 displays the above animation such as the frame out of the capture screen 183 (step S108), and the game processing unit 151 terminates the suspended game processing (step S109).

The skip processing unit 153 refers to the stage list, and determines whether there is the next stage, that is, whether the stages up to the hundredth stage have been completed (step S110). When there is the next stage (YES in step S110), the skip processing unit 153 downloads and reads the stage data of the next stage (step S111), and the game processing unit 151 starts the game processing using the stage data (step S112).

Meanwhile, when there is no stage data of the next stage, that is, when the stage up to the last stage in the stage list has been completed (NO in step S110), the skip processing unit 153 downloads a new stage list from the server, using the communication unit 16 or the like (step S113), and returns to step S110. In this case, the skip processing unit 153 determines that there is the stage list, in step S110. Therefore, in step S111, the skip processing unit 153 downloads the stage data of the next stage, that is, the stage data of the first stage of the new stage list, and in step S112, the game processing unit 151 performs the game processing of the first stage.

When no slide operation is performed in a slide effective state (NO in step S106) and the touch operation is cancelled (YES in step S107), the displayed stop screen 184 is hidden, and the game processing, which has been suspended in the suspension processing, is resumed (step S114). Further, the processing is returned to step S103, and the suspension processing unit 152 monitors the touch-on operation.

As described above, according to the game device 10 of the present embodiment, during the play of the stage, the slide operation is performed to the capture screen, so that the stage is skipped and is transferred to the next stage. Therefore, the operation for the skip to the next stage can be easily and intuitively performed. Such a convenient operation for the skip to the next stage is effective especially when the game of the stage created and posted by another user is played like the present embodiment. That is, some of the stages created by other users may be too easy or too difficult for the user, and a large number of requests to skip such stages during play is expected. Therefore, in the game software, the simple and intuitive operation for the skip like the above embodiment is especially effective.

Further, according to the game device 10 of the above embodiment, when the user performs the touch-on operation in order to move onto the next stage, the game processing is suspended and the slide effective state becomes available where the stop screen is generated using the capture screen that is the captured game screen of that time, and the stop screen is displayed. Therefore, the user can cancel the skip to the next stage and returns to the game of the former stage in the slide effective state. In addition, the game does not progress during the slide operation.

Further, according to the game device 10 of the above embodiment, after the slide effective state is made available by the touch-on operation, the information processing is transferred to another information processing in wait for the slide operation. Therefore, a problem of skipping the processing in execution by an erroneous operation, which may occur in a case where the information processing is instantly transferred to another information processing by a single operation, can be avoided.

Note that, in the above embodiment, all of the configuration elements of the game device 10 are included in an integrated device, i.e., the game device 10. However, the configuration elements may be distributed in a plurality of devices, and a game system as an information processing system may be configured from the plurality of devices. For example, the operation unit 11 and the display panel 18 may be respectively included in different devices from an information processing apparatus that includes other configuration elements. To be specific, the operation unit 11 may be a controller, and a television monitor may be used as the display panel 18, and the game system may be configured from these controller and television monitor, and an information processing apparatus that includes other configuration elements.

Further, in the above embodiment, the touch panel 12 is superimposed on the display panel 18, and the touch operation is performed to the game screen 181 or the stop screen 184 displayed on the display panel 18. However, the display panel 18 and the touch panel 12 may be separately provided. In this case, when the touch operation is given, a point corresponding to the touch position on the touch panel 12 may be displayed on the display panel 18, as a cursor.

Further, in the above embodiment, when the direct distance between the touch position of a predetermined time before, and the current touch position is larger than a predetermined distance, the skip processing unit 153 detects the operation to move the touch position in that way, as the slide operation for performing the skip processing. However, the condition of the detection is not limited to the movement of the touch position within the predetermined time. When the direct distance between the first touch position and the current touch position becomes a predetermined distance or more, the skip processing unit 153 may detect the operation, as the slide operation for performing the skip processing. Further, when a length of an accumulated moved distance from the touch position of at a certain point of time in the past to the current touch position exceeds a predetermined distance, the skip processing unit 153 may detect the operation, as the slide operation, instead of the length of the direct distance between the touch position of at a certain point of time in the past and the current touch position. In other words, the slide amount in detecting the slide operation for performing the skip processing may be the direct distance between the touch positions, or may be the length of a moving locus of the touch position. In this case, an average in an input direction in frame units may be used as the slide direction.

Further, in the above embodiment, a case where the information processing apparatus is the game device that performs the game processing as the information processing has been exemplarily described. However, an embodiment is not limited to the case, and the information processing apparatus may perform information processing other than the game processing. For example, the information processing apparatus may be a device that plays back content that makes progress over time, such as moving image data or music data.

For the moving image data or the music data, a playback method in which the moving image data or the music data is divided into a plurality of unit content items, like the game described in the above embodiment, and the unit content items are arranged in a certain order, and are processed in order can be expected. Therefore, transfer to playback of the next unit content without waiting for termination of the unit content being in playback by performing the skip processing can be requested by the user.

The unit content of the moving image data may be a chapter or a scene, in a case where the moving image data is data of movie content. In this case, a list of a plurality of chapters that configures a piece of movie may be prepared as a list corresponding to the stage list of the above embodiment. The unit content of the music data may be one piece of music. In this case, a play list in which a plurality of pieces of music is arranged in order may be prepared as a list corresponding to the stage list of the above embodiment. Further, as for the moving image data, a play list in which a plurality of unit content items is arranged in order may be prepared, similarly to the music data.

Further, in the above embodiment, when there is the slide operation, the capture screen is caused to frame out while being moved toward the direction of the slide operation. However, an embodiment is not limited to the case. The direction of the frame out is not limited to the sliding direction, and may be a fixed direction.

Further, in the above embodiment, when there is the slide operation, the skip processing to the next unit content is performed regardless of the sliding direction. However, an embodiment is not limited to the case. Different processing may be performed according to the direction of the slide operation. For example, when the sliding direction is a right direction, the skip may be made to the next unit content according to the listed order of the list, and when the sliding direction is a left direction, the skip may be made to the previous unit content according to the listed order of the list.

Further, for example, when a plurality of pieces of music is arranged in order and forms a set (playlist), like music data, and a plurality of sets is prepared and the sets are arranged in order, the skip may be made to the next/previous music in the same set when the sliding direction is a right and left direction, and the skip may be made to (the first music of) the next/previous set when the sliding direction is an up and down direction.

Further, in the above embodiment, the list (stage list) is prepared in advance, and when there is the slide operation, the next unit content (stage data) is downloaded according to the listed order of the list. However, such a list may not be prepared. When no list is prepared, the next unit content may be determined when there is the slide operation. Further, in the above embodiment, the unit content is downloaded from the server every time the information processing (game processing) using the unit content (stage data) is performed. However, a plurality of unit content items included in the list may be stored in the information processing apparatus in advance, or the next content item may be sequentially downloaded in the background according to the list.

Further, when the skip processing is performed, information that indicates uncompleted processing may be provided to the unit content for which the processing is suspended and has not been completed, or to information that identifies the unit content. Further, as described in the above embodiment, when the next unit content (the stage data of the next stage) is downloaded in the skip processing, the unit content in processing may be discarded (deleted), or may be continuously stored in the memory 14. When the unit content is continuously stored, the information that indicates uncompleted processing may be added to the stored data.

Further, in the above description, a case where the information processing uses the game content, the moving image content, and the music content has been exemplarily described. However, the information processing is not limited to processing using content. The technology can be applied to a case where there is a plurality of series of information processing, and an information processing apparatusesequentially performs the information processing, and when the information processing apparatuseswitches certain information processing to the next information processing before the certain information processing is completed.

What is claimed is:

1. An information processing apparatus comprising a memory, at least one processor, and a touch panel configured to receive user operations, the at least one processor being configured to:

load first data related to a first game stage of game processing into the memory and execute the first game stage, of which a completion condition is satisfied based on user operations causing reactions in a virtual space of the first game stage;

determine whether the completion condition of the first game stage is satisfied by the user operations while executing the first game stage;

in response to the determination that the completion condition of the first game stage is satisfied, determine the completion of the first game stage and execute a second game stage of game processing based on second data related to the second game stage and loaded into the memory;

in response to a touch-on operation to the touch panel, suspend the first game stage of game processing in execution, resize the displayed portion of the virtual space of the first game stage within the screen on the touch panel to indicate the suspension of the first game stage, and display a message notifying the availability of skipping the first game stage by a slide operation to the touch panel; and in response to the slide operation to the touch panel while the first game stage is being suspended, move at least a part of a displayed portion of the virtual space along a sliding direction of the slide operation to be at least partially outside of a screen on the touch panel, skip the execution of the first game stage without determining whether the completion condition of the first game stage is satisfied, and execute the second game stage based on the second data loaded into the memory.

2. The information processing apparatus according to claim 1, wherein the at least one processor is configured to cancel suspension when a touch-off operation is performed after the touch-on operation is performed, and resume the suspended first game stage when the suspension is canceled.

3. The information processing apparatus according to claim 1, wherein the at least one processor is configured to switch from executing the first game stage to executing the second game stage when there is the slide operation after the touch-on operation and before a touch-off operation.

4. The information processing apparatus according to claim 1, wherein the first game stage comprises processing using content that makes progress over time.

5. The information processing apparatus according to claim 4, wherein the content is game content, and the first game stage includes game content that makes progress over time without depending on an operation of a user.

6. The information processing apparatus according to claim 1, wherein the game processing is a series of stage-based game processing, and the second game stage is game processing of a stage next to the first game stage.

7. The information processing apparatus according to claim 4, wherein the content is moving image content or music content, and the first game stage comprises playback processing of the content.

8. The information processing apparatus according to claim 4, wherein
the plurality of content items is arranged in order and forms a set, and a plurality of the sets is arranged in order, and
the at least one processor is configured to start the second game stage using another content before or after the content used by the first game stage, and belonging to a same set as the content used by the first game stage, or start game processing using content belonging to another set before or after the set of the content used by the first game stage, according to a direction of the slide operation.

9. The information processing apparatus according to claim 1, further comprising:
a storage device configured to store information that identifies the suspended first game stage, in response to the slide operation.

10. The information processing apparatus according to claim 1, wherein the at least one processor is configured to switch from executing the first game stage to executing the second game stage, in response to the slide operation in a predetermined direction.

11. The information processing apparatus according to claim 10, wherein the at least one processor is configured to switch from executing the first game stage to executing another game stage of the game processing, said another game stage differing depending on a direction of the slide operation.

12. The information processing apparatus according to claim 1, wherein the at least one processor is configured to determine that the slide operation has been performed when a slide amount is a predetermined value or more than the predetermined value.

13. The information processing apparatus according to claim 12, wherein the at least one processor is configured to determine that the slide operation has been performed when the slide amount within a predetermined time period is a predetermined value or more than the predetermined value.

14. The information processing apparatus according to claim 1, wherein
when the first game stage is suspended, the at least one processor is configured to stop a screen to be displayed.

15. The information processing apparatus according to claim 1, wherein the first game stage has a predetermined time limit for completion, and the second game stage is next to the first game stage.

16. The information processing apparatus according to claim 1, wherein the first game stage has a predetermined time limit for completion, and the first game stage is determined to be completed when the completion condition of the first game stage is satisfied based on the user operations within the predetermined time limit.

17. An information processing system comprising a touch panel configured to receive a user input and at least one processor,
the at least one processor being configured to:
execute a first game stage of game processing, of which a completion condition is satisfied based on user operations causing reactions in a virtual space of the first game stage;
determine whether the completion condition of the first game stage is satisfied;
in response to the determination that the completion condition of the first game stage is satisfied, determine the completion of the first game stage and execute a second game stage of game processing;
in response to a touch-on operation to the touch panel, suspend the first game stage in execution, resize the displayed portion of the virtual space of the first game stage within the screen on the touch panel to indicate the suspension of the first game stage, and display a message notifying the availability of skipping the first game stage by a slide operation to the touch panel; and
in response to the slide operation to the touch panel while the first game stage is being suspended, move at least a part of a displayed portion of the virtual space along a sliding direction of the slide operation to be at least partially outside of a screen on the touch panel, skip the execution of the first game stage without determining whether the completion condition of the first game stage is satisfied, and execute the second game stage.

18. The information processing system according to claim 17, wherein the first game stage has a predetermined time limit for completion, and the second game stage is next to the first game stage.

19. An information processing method comprising:
executing first game stage of game processing by at least one processor, the first game stage being a stage of which a completion condition is satisfied based on user operations causing reactions in a virtual space of the first game stage;
determining whether the completion condition of the first game stage is satisfied, in response to the determination that the completion condition of the first game stage is satisfied, determining the completion of the first game stage and executing a second game stage of game processing;

in response to a touch-on operation to the touch panel, suspending the first game stage in execution, resizing the displayed portion of the virtual space of the first game stage within the screen on the touch panel to indicate the suspension of the first game stage, and displaying a message notifying the availability of skipping the first game stage by a slide operation to the touch panel; and in response to a slide operation to the touch panel while the first game stage is being suspended, moving at least a part of a displayed portion of the virtual space along a sliding direction of the slide operation to be at least partially outside of a screen on the touch panel, skipping the execution of the first game stage without determining whether the completion condition of the first game stage is satisfied, and executing the second game stage.

20. A non-transitory computer-readable storage medium storing an information processing program for, by being executed by a computer, causing the computer to:

execute a first game stage of game processing, of which a completion condition is satisfied based on user operations causing reactions in a virtual space of the first game stage;

determine whether the completion condition of the first game stage is satisfied;

in response to the determination that the completion condition of the first game stage is satisfied, determine the completion of the first game stage and execute a second game stage of game processing;

in response to a touch-on operation to the touch panel, suspend the first game stage in execution, resize the displayed portion of the virtual space of the first game stage within the screen on the touch panel to indicate the suspension of the first game stage, and display a message notifying the availability of skipping the first game stage by a slide operation to the touch panel; and in response to the slide operation to the touch panel while the first game stage is being suspended, move at least a part of a displayed portion of the virtual space along a sliding direction of the slide operation to be at least partially outside of a screen on the touch panel, skip the execution of the first game stage without determining whether the completion condition of the first game stage is satisfied, and execute the second game stage.

21. An information processing apparatus comprising a memory, at least one processor, and a touch panel configured to receive user inputs, the at least one processor being configured to:

load first data related to a first game stage of game processing into the memory and execute the first game stage, the first game stage being executed based on user operations causing reactions in a virtual space of the first game stage;

in response to a touch-on operation to the touch panel while the first game stage is being executed based on user operations, suspend the first game stage in execution, resize the displayed portion of the virtual space of the first game stage within the screen on the touch panel to indicate the suspension of the first game stage, and display a message notifying the availability of skipping the first game stage by a slide operation to the touch panel; and in response to the slide operation to the touch panel while the first game stage is being suspended, move at least a part of a displayed portion of the virtual space along a sliding direction of the slide operation to be at least partially outside of a screen on the touch panel, and skip from executing the first game stage in suspension to executing a second game stage based on related second data loaded into the memory.

\* \* \* \* \*